Feb. 15, 1927. 1,617,654
A. SIVADE
MEANS FOR CLEANING SAND FILTERS OF LARGE SURFACE
Filed Oct. 18, 1923   3 Sheets-Sheet 1

Inventor
A. Sivade
By Marks & Clerk
Attys

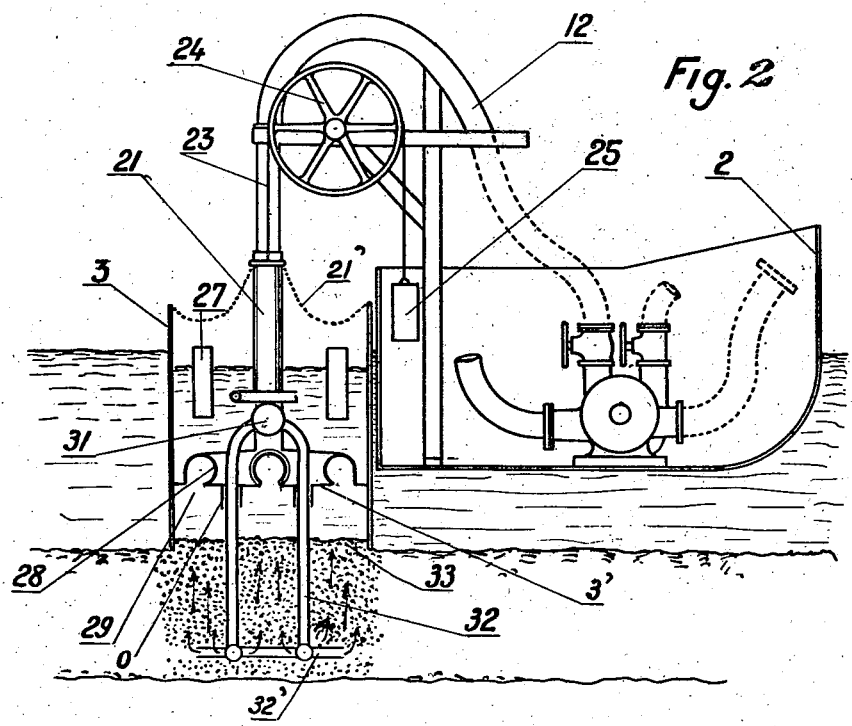
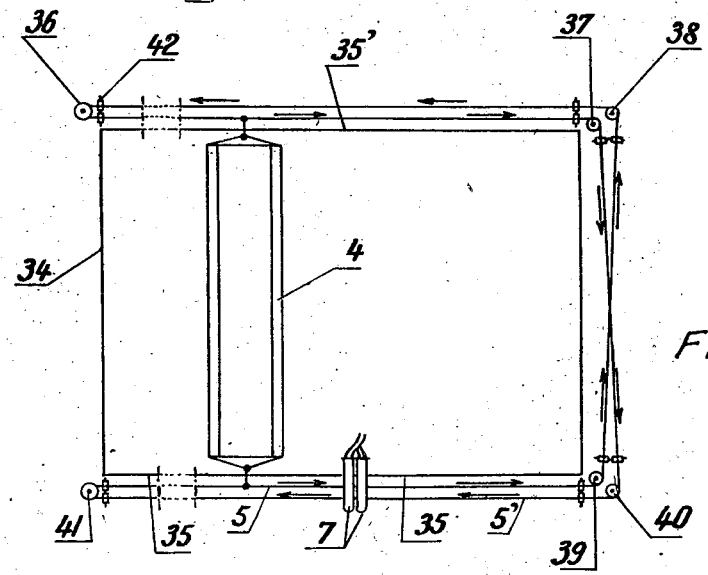

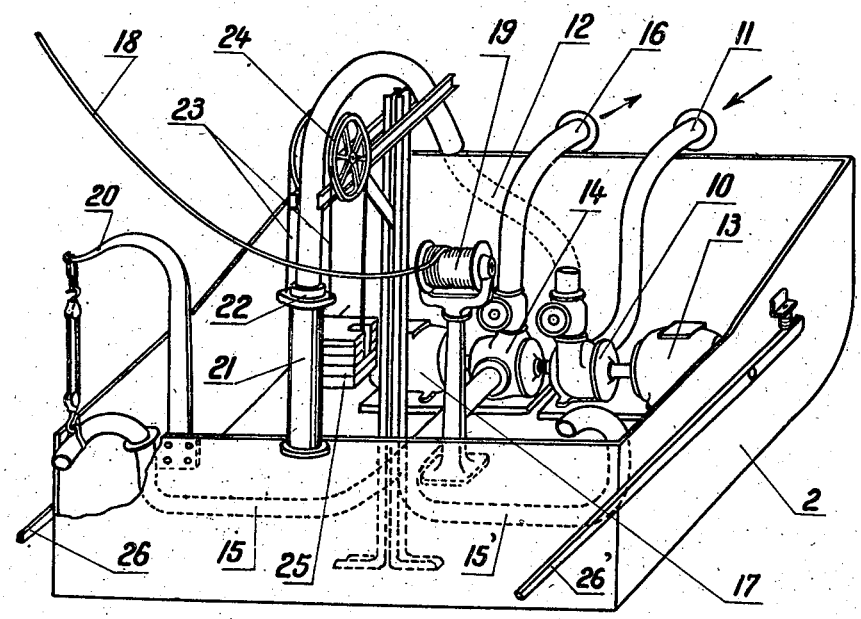

Patented Feb. 15, 1927.

1,617,654

UNITED STATES PATENT OFFICE.

ANDRÉ SIVADE, OF PARIS, FRANCE.

MEANS FOR CLEANING SAND FILTERS OF LARGE SURFACE.

Application filed October 18, 1923, Serial No. 669,433, and in France October 20, 1922.

It is recognized that when water is passed through sand filtering beds it leaves a deposit of sludge upon the filter. This deposit is naturally greater at the surface, but the particles of sludge may also penetrate to some depth into the layer of sand, and particularly when the speed of filtering is high. In all cases it is observed that sand filters become clogged up by the sludge after a certain time, and the water will not circulate unless the filter is cleaned.

In the ordinary cleaning process which is the only one in current use for filters of large surface, the water is evacuated from the filter and the surface layer of sand is scraped off and discharged at a point outside the filter, the sand being subsequently separated from the sludge by a washing process. But in this method the filters are removed from service for a long period during each washing operation and the expense for labour is considerable, while fresh sand must be added to the filters at stated times. Again, only the surface of the filter can be cleaned, and a certain amount of sand is necessarily lost in the washing process.

It has been proposed to carry out a mechanical scraping without previous emptying of the filter by the use of apparatus mounted upon rolling bridges or cranes travelling upon the walls of the basins, but this method is not suitable for filters of large size.

It has also been proposed to clean the sand throughout the whole mass by making use of ascending currents of air or water in order to bring the sludge to the surface, and it is then discharged through overflow orifices, but since this matter cannot be held in suspension in a horizontal current of water, the process is only applicable to filters of small surface wherein it is feasible to provide an ascending current upon the whole surface of the filter during the operation.

My invention relates to a process which is particularly applicable to filters of large surface, and without any preliminary evacuation or the use of a general ascending current, I am enabled to proceed with a very regular cleaning of the filter, the sand being washed on the spot and throughout the whole thickness (or if desired, to a given limit of depth) and the sludge being removed without affecting the sand.

My said process essentially consists in isolating a certain part of the surface of the filter by disposing upon the sand either a receptacle consisting of a box which is closed at the top and open at the bottom, or preferably a frame whose top extends above the surface of the water; the sand which is situated below the said receptacle or frame is washed by any desired process so that the sludge is caused to rise above the surface of the sand; the water is then withdrawn from the said receptacle or frame by means of one or more conduits which are connected with a pump and whose orifices are in all cases maintained at a sufficient distance above the sand.

During the evacuation of the water, a depression is produced in the said receptacle or frame, accompanied by a slight elevation of the surface of the sand, and a sort of sand joint will thus be formed at the bottom of the apparatus which prevents the withdrawing action from being exercised upon the adjacent parts of the filter. But the said joint is sufficiently permeable to allow the water and sludge to pass upwardly through the same. Further, all the liquid streams of the ascending current will remain sufficiently vertical to hold the sludge in suspension as far as the openings of the discharge conduits. In these conditions, it is simply necessary to regulate the output of the pump in such maner that the current shall have sufficient speed to draw off the whole amount of the sludge but shall not be enabled to draw off even the finest grains of sand.

By the use of this method I am enabled to carry out a veritable selection between the particles of the sludge and the grains of sand. whence the term "selector" which is applied to the pumping arrangement, and by extension, to the plant as a whole.

It is obvious that were the said receptacle not employed, the effect of the withdrawal would be exercised upon the whole of the surrounding mass of water, resulting in a useless consumption of water, whilst the liquid streams would be more or less oblique and even horizontal, and hence the selection could not be carried out.

The said receptacle or frame is moved at stated intervals over the whole surface of the filter during the cleaning operation.

In the preferred process for bringing the sludge to surface of the sand water is injected into the mass of the sand through the said receptacle or frame by a horizontal grid made up of perforated tubes. Experience shews that the layers of sand will not offer any appreciable resistance to the sinking of these devices into the mass.

As regards the said box (or caisson), the top part may be arranged for the insertion of the supply pipes by the use of suitable leather packing disposed in the apertures through which the pipes are caused to pass.

In the case of the frame, it is preferable to provide the same, at the level of the suction inlets, with a horizontal partition which is joined to the said inlets and is also provided with holes for the insertion of the supply pipes. These holes have no watertight packing, as it is desired that the pressures shall be balanced on either side of the partition, but they may be provided with downwardly extending necks. When thus disposed, the said partition has the effect of draining the finer portions of the sludge towards the suction part, as otherwise these portions would tend to float upon the surface.

Should the apparatus comprise a plurality of suction conduits or of injection tubes, it is desirable to provide an equal output for all orifices of a like nature, in order that the cleaning shall be performed with the greatest regularity. This result can be obtained by giving to the supply and the withdrawal conduits co-operating with said orifices a suitable diameter which varies in such manner that the said conduits shall be isobaric, and for this purpose it is simply necessary that between any two points of a given conduit, the variation in height of the fall $\left(\frac{V^2}{2g}\right)$ corresponding to the speed shall compensate for the losses of pressure.

An arrangement in which the said method is carried into effect is shewn by way of example in the appended drawings, and it comprises the following essential elements:

A floating chamber or pontoon containing the feed pumps and the suction pumps, and provided with supports for the piping and for the said frame. The latter is displaced along a horizontal beam or rail having a suitable position. The outfit is completed by an automatic lifting device for the injection pipes, as well as a set of floating pipes for the outside supply of clean water and for the evacuation of the foul water, a device for displacing the said rail, and an arrangement for the hoisting and the transportation of the apparatus. Various constructional details are further provided, as will be mentioned hereunder.

Referring to the appended drawings:

Fig. 2 is a transverse section of the frame, shewing the pipes in the operative position.

Fig. 3 is a perspective view of the pontoon containing the pumps and piping for supply and the evacuation purposes.

Figure 1:
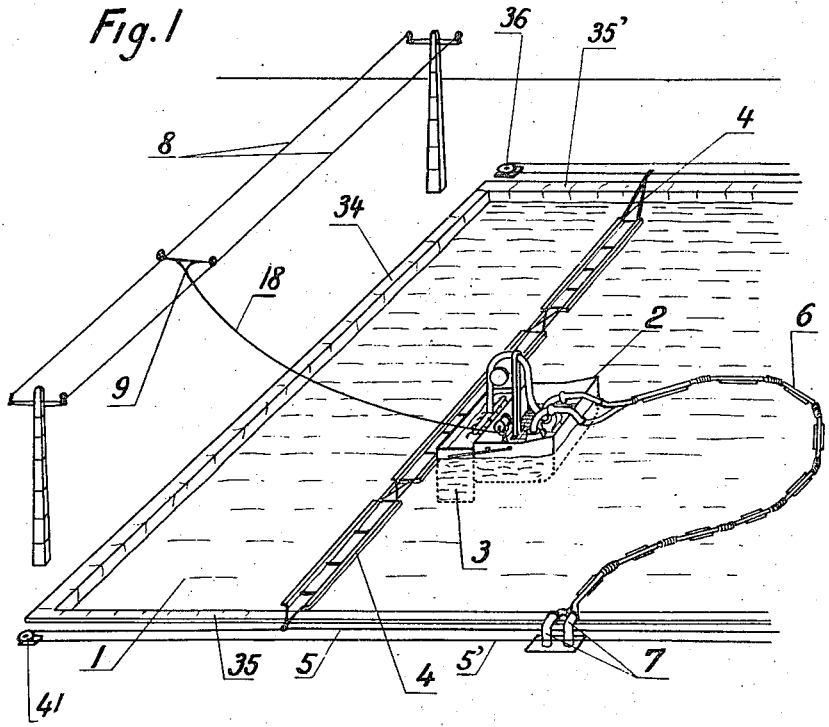
Fig. 1 is a perspective view of a plant according to the invention, using electric power.

Fig. 4 shews the means for displacing the guide rail of the frame.

The entire plant for cleaning the large sand filter 1 comprises the following elements, Fig. 1, which will be further described in detail:

A pontoon 2 containing the pumps and piping, and also supporting the watertight frame 3 within which are disposed the suction and discharge pipes; a horizontal support or rail 4 along which the said frame is displaced; an endless cable 5, 5' serving to displace the said rail sidewise along the filter; a double set of floating pipes 6 for the supply of clean water and the evacuation of the foul water, the pipes being connected at 7 outside the filter with stationary piping; and an overhead line 8 with the trolley 9 for the supply of current to the pumps.

The pontoon, Figs. 2 and 3, contains the pump 10 which is supplied through the pipe 11 with clean water for injection purposes, the water being delivered through the piping 12. The said pump is driven by the electric motor 13. The pump 14 withdraws the foul water through the pipes 15 and 15', the water being then discharged through the pipe 16; the pump is driven by the electric motor 17. Current for the motors 13 and 17 is supplied by the cable 18 having two conductors and wound upon the drum 19, with the use of suitable slip rings and brushes connected with the motors. The brackets 20 (only on being shewn) serve to support the suction pipes 15, 15'. The pipe 12 for the discharge of the clean water for injection purposes from the pump 10, terminates within a vertical telescoping tube 21 (Fig. 3) having the flange 22 to which are attached two cables 23 passing over the sheaves 24 and secured to a counterweight 25. Under the action of the said weight the tube 21, to the end of which is secured the injection pipe, tends to assume the upper position. At the sides of the pontoon are mounted the arms 26, 26' between which is disposed the frame 3.

The watertight frame 3, Figs. 1 and 2, which is made preferably of aluminium or duralumin plate, is provided in the interior (or at the exterior) with the floats 27 so as to be partially sustained by its own means. The height of the said floats is adjustable. The arms 26, 26' prevent the frame from moving sidewise and also from sinking into the sand during the pumping operation.

Within the frame 3 are disposed the suction and the delivery pipes. The suction pipes 15, 15' are connected with the grid 28 consisting of isobaric piping provided with the orifices 29 disposed at a suitable height above the surface of the sand. The pipes 15, 15' are provided with foot-valves, and if necessary with air inlets for priming purposes.

The telescopic tube 21 for the water supply is connected with the isobaric pipe 31 provided with the tubes 32 which supply the horizontal grid 32' consisting of perforated pipes.

The telescopic tube 21 is attached to the upper edges of the frame 3 by the chains 21'. The whole device is so disposed that when the tube 21 is in the upper position, the tubes 32 and the grid 32' are entirely removed from the sand and the frame is somewhat raised by the chains 21'.

Fig. 2 further indicates the horizontal partition 3' disposed within the frame 3 at the level of the suction inlets 29 and connected therewith, the partition being provided with the conduits 0 for the insertion of the injection pipes 32.

The pipes constituting the double floating system consist of sheet metal sections connected together by flexible portions for instance of india rubber, with rapid coupling arrangements, and provided with floats; the double conduit is connected at the outside at 7 respectively with a water supply at atmospheric pressure and with a discharge orifice.

In certain cases the water for injection purposes can be taken off at the surface of the filter, and particularly where the filter is itself supplied with prefiltered water. On the other hand, if it is not desired to effect the cleaning by means of the surface layer of water, the cleaning may be performed solely by the use of the suction grid operating within the frame.

The operation of the said arrangement is as follows:

When the apparatus has been mounted in position by means of the counterweight 25, the telescoping tube 21 is in the upper position, so that the tubes 32, 32' will now be withdrawn entirely out of the sand. The frame which is supported by the chains 21' will be slightly out of contact with the surface of the sand. The pumps 10 and 14 are then started by means of their rheostats. The action of the water supplied by the pump 10 upon the walls of the tube 21 and of the pipe 31 will be sufficient to overcome the effect of the counterweight, so that the tubes 32, 32' are allowed to descend into the sand. This descending movement is produced by the sole action of the weight of the said grid, combined with the effect on the sand of the water which is injected and flows out through the holes of the grid, no mechanical device of any kind being provided to push the cleaning grid downwards. The grid 32' can be stopped at any desired depth by the mere hand actuation, for instance of the counterweight 25 which requires but a very slight effort. At the same time the frame 3 which is no longer held by the chains 21' will come into actual contact with the surface of the sand, but it cannot sink into the latter as it is held by the arms 26, 26'.

The starting of the suction pump produces a slight depression within the said frame, and this will raise the level of the sand within the frame at 33 by a few centimetres, so that the sand thus raised will form a veritable joint which is permeable to the ascending currents but strictly limits the extent of the filter which is subjected to the cleaning operation.

The injection water issues from the tubes 32 or from the grid 32' at a slight pressure and rises to the surface of the sand, thereby stirring up the latter and entraining the sludge to a point above the joint 33. From this point onward, the speed of the ascending current will be insufficient to carry with it the grains of sand, but will still be enabled to draw along the sludge, so that the latter is brought to the inlets 29 of the suction grid and proceeds within the latter, being subsequently discharged by the pump 14.

After a few seconds, when the water in the frame has become quite clear, the pumps are stopped by cutting off the current. The sand raised at 33 now sinks into place. The weight 25 raises the tube 21, and hence the tubes 32, 32' are lifted out of the sand; the frame is raised by means of the chains 21'. It will then be an easy matter to displace the apparatus in order to clean another portion of the filter.

For the proper cleaning of the entire filter, the frame must be displaced at regular intervals along the surface of the latter, and this is carried out by first moving the frame along the edge 34, Fig. 1, and then along the rail 4. The pontoon and the frame can be moved by means of a boat hook. The rail 4 will naturally float upon the surface, and it is made up of elements whose number depends upon the width of the filter.

When the frame reaches the end of the rail, the latter is now to be moved sidewise through a distance equal to the width of the frame, and this may be carried out for instance by means of the following device which has the advantage of requiring only one person for its operation.

An endless cable 5, 5', Fig. 4, is disposed along three sides of the filter, the sides 35 and 35' being perpendicular to the said rail; the cable is mounted on various pulleys 36, 37, 38, 39, 40, 41 and is supported at intervals by rollers 42. By drawing upon one of the cables in the proper direction, this will provide a cable strand at each side 35, 35' moving in the required direction for the displacement of the said rail. It is simply necessary to connect the ends of the rail respectively with the said cable strands in order that the rail may be displaced in the proper direction by a simple traction upon the cable.

When about half the surface of the filter has been thus cleaned, one removes the last section of the rail adjacent the side 35, and the whole arrangement, of pontoon, frame and floating conduits is brought over to the other side of the rail; the said rail section is put in place, and the cleaning is continued as before, now operating upon the other side of the rail. The last displacement is effected by moving the frame along the edge of the filter opposite the starting edge 34.

After the filter has been entirely cleaned, the outfit must be removed and transported to another basin along the passageways of the filtering plant, and this can be done for example by means of trailers coupled to a tractor; the outfit is loaded upon the tractors by means of inclined beams and a winch, and the outfit is unloaded in like manner when it is to be placed in the water.

Obviously, the constructional details hereinbefore set forth are given solely by way of example, and these are susceptible of all desired modifications without departing from the principle of the invention. For instance the pumps may be disposed at the sides of the filter; where a filtered water supply conduit is not required, the said floating conduit may be replaced by a floating trough which also serves as a guide rail; the suction device in the frame (or caisson) may comprise only a single orifice; the telescoping tube of the supply system may be replaced by flexible conduits, and in this event the tubes descend into the sand by their own weight and are raised by a hand winch on the pontoon; in certain cases the arrangement of pontoon and rail can be replaced by a rolling bridge mounted on the walls of the filter; like modifications may also be made.

To recapitulate, my said process provides for the rapid cleaning of large-sized filters without any preliminary emptying or subsequent filling of the same, without the use of a general ascending current upon the whole surface of the filter, and without entraining the sand along with the sludge whereby the wear of the pumps is reduced to the minimum and the filtering can be effected upon a layer of sand of uniform thickness, while on the other hand it will not be necessary to renew the sand. The whole thickness of the sand layer will be cleaned, and the sand is also arranged in an automatic manner so that the size of the grains will decrease towards the surface.

What I claim is:

1. A device for the cleaning of sand filters of large surface in a discontinuous way by stirring the filtering bed solely by the action of water, comprising a frame the lower edges whereof are adapted to rest along their whole periphery upon the bed, a hollow horizontal grid provided with regularly spaced injection openings on the whole surface enclosed in the frame, a pump for feeding water into said grid, means for lowering said grid to any desired depth under the surface of the bed, suction pipes above said grid in the frame a pump for said suction pipes, and means for moving the frame from one position to another.

2. A device for the cleaning of sand filters of large surface in a discontinuous way by stirring the filtering bed solely by the action of water, comprising a frame the lower edges whereof are adapted to rest along their whole periphery upon the bed, a hollow horizontal grid provided with regularly spaced injection openings on the whole surface enclosed in the frame, a pump for feeding water into said grid, means for lowering said grid to any desired depth under the surface of the bed, suction pipes above said grid in the frame, a pump for said suction pipes, means for giving an equal output for all of the injection openings and for all of the suction openings, and means for moving the frame from one position to another.

3. A device for the cleaning of sand filters of large surface in a discontinuous way by stirring the filtering bed solely by the action of water comprising a frame, the lower edges whereof are adapted to rest along their whole periphery upon the bed, a hollow horizontal grid provided with regularly spaced injection openings on the whole surface enclosed in the frame, a pump for feeding water into said grid, means for lowering said grid to any desired depth under the surface of the bed, suction pipes above said grid in the frame, a pump for said suction pipes, isobaric conduits for feeding the injection openings and collecting the water sucked by the suction pipes, and means for moving the frame from one position to another.

4. A device for the cleaning of sand filters of large surface in a discontinuous way by stirring the filtering bed solely by the action of water, comprising a frame the lower edges whereof are adapted to rest along their whole periphery upon the bed, a hollow horizontal grid provided with regularly spaced openings on the whole surface enclosed in the frame, a pump for feeding water into said grid, a set of discharge tubes connecting said pump with said grid, means for lowering said grid to any desired depth under the surface of the bed, suction pipes above said grid in the frame, a pump for said suction pipes, a horizontal partition on the same level as the openings of the suction pipes and leaving said openings free, conduits provided in said partition and allowing the passage of the discharge tubes, and means for moving the frame from one position to another.

5. A device for the cleaning of sand filters of large surface in a discontinuous way by stirring the filtering bed solely by the action of water, comprising a frame, the lower edges whereof are adapted to rest along their whole periphery upon the bed, a hollow horizontal grid provided with regularly spaced injection openings on the whole surface enclosed in the frame, a pump for feeding water into said grid, a telescoping tube supporting said grid and communicating with the same, chains supporting the frame and attached to said telescoping tube, suction pipes above said grid in the frame, a pump for said suction pipes, and means for moving the frame from one position to another.

6. A device for the cleaning of sand filters of large surface in a discontinuous way by stirring the filtering bed solely by the action of water, comprising a frame the lower edges whereof are adapted to rest along their whole periphery upon the bed, a hollow horizontal grid provided with regularly spaced injection openings on the whole surface enclosed in the frame, means for lowering said grid to any desired depth under the surface of the bed, suction pipes above said grid in the frame, a pontoon for supporting all of said parts, a pump for feeding water into the grid, a pump for the suction pipes and floating pipes for connecting the cleaning device with a stationary piping 7. A device for the cleaning of sand filters of large surface in a discontinuous way by stirring the filtering bed solely by the action of water, comprising a frame, the lower edges whereof are adapted to rest along their whole periphery upon the bed, a hollow horizontal grid provided with regularly spaced injection openings on the whole surface enclosed in the frame, means for lowering said grid to any desired depth under the surface of the bed, suction pipes above said grid in the frame, a pontoon for supporting all of said parts, a pump for feeding water into the grid, a pump for the suction pipes, floating pipes for connecting the cleaning device with a stationary piping, a floating rail bridging the filter, means whereby the pontoon is movable along the said rail, an endless cable along the sides of the filter and connected to the ends of the rail.

In witness whereof I have hereunto set my hand.

ANDRÉ SIVADE.